UNITED STATES PATENT OFFICE.

ROBERT H. PICKLES, OF MARPLE, ENGLAND.

MORDANT.

SPECIFICATION forming part of Letters Patent No. 530,202, dated December 4, 1894.

Application filed November 9, 1892. Serial No. 451,437. (No specimens.)

*To all whom it may concern:*

Be it known that I, ROBERT HENRY PICKLES, a subject of the Queen of Great Britain, residing at Marple, in the county of Chester, England, have invented certain new and useful Improvements in Mordants for the Dyeing or Printing of Textile Fabrics or other Materials, of which the following is a specification.

The object of this invention is to provide mordants with a base of aluminum, iron or chromium better adapted for the purpose of dyeing and printing than the acetates, nitroacetates, sulfo-acetates, chloro-acetates, chlorids, nitrates, oxalates, tartrates, citrates and sulfo-cyanates of these metals which have hitherto been used for the purpose.

It consists essentially of a mordant composed of a sucrate, saccharate or glucate having as a base one of the metals of the iron group either aluminum, iron or chromium, either separately or together with or in combination with another salt of the same metals.

In carrying out the invention I form the sucrate, saccharate or glucate [hereinafter comprehended under the word "sucrate"] of the metal required by adding to a solution of sucrate of lime, strontium or barium [hereinafter understood as grouped and comprehended under the term "lime," preferably the dicalcium sucrate $C_{12}H_{20}O_{11}(CaOH)_2$ or the tricalcium sucrate $C_{12}H_{19}O_{11}(CaOH)_3$] the sulfate of the metal required. The sucrate is decomposed, sulfate of lime is formed and precipitated out of the solution and the sucrate of the metal which formed the base of the sulfate remains.

To form the sucrate of lime I take sugar, treacle, glucose or other carbohydrate and to every one part by weight I take one third part of well burnt dry lime. The lime I then slake in hot or boiling water and reduce by adding more water to the consistency of a thin cream. The saccharine matter I reduce in specific gravity to 1.15. The two are then mixed together. The reaction causes a considerable development of heat, to an extent that I do not find it necessary to submit the mixture to further heat the reaction resulting in a solution of sucrate of lime of a more or less brown color. To form therefrom the metallic sucrate:—To the sucrate of lime thus formed to prepare the aluminum compound I add for every eight parts of the sugar, treacle or glucose nine parts of sulfate of alumina, or if a more basic compound is desired I add eleven parts of the sulfate of alumina previously made basic by the addition to its solution of one-third of a part of chalk. To prepare the ferrous iron compound I add to the same quantity of the sucrate or saccharate eleven parts by weight of ferrous sulfate or copperas, and for the ferric iron compound a proportionate quantity of ferric sulfate or rusty copperas; and to prepare the chromium compound I add to a like quantity of the sucrate of lime say ten or twelve parts of chromium sulfate or its chemical equivalent of a chrome alum the proportion varying according to the amount of sulfuric acid contained in the particular sulfate used.

In all the compounds the neutral or basic sulfate can be used as desired to produce more or less basic sucrates or saccharates.

This invention is not limited by the quantities here stated either to form the sucrate or saccharate of lime or subsequently therefrom the metallic sucrate or saccharate but I find that the quantities stated give good results.

On adding the metallic sulfate to the solution of sucrate of lime sulfate of lime is precipitated out of the solution and the clear liquor contains in solution the sucrate of the particular metal of which the sulfate was added. The sucrate can be separated from the sulfate of lime by decantation or filtration or other convenient method and the latter can then be washed and recovered.

When a metallic sucrate is required with the least amount of extractive coloring matter I use by preference sugar or glucose in forming the sucrate of lime and in the case of cane sugars I first boil them with about one-thirtieth of their weight of sulfuric acid to convert them into grape sugar.

The mordants so prepared may be expressed by the general formulæ $C_{12}H_{22}O_{11}M_2(OH)_6$ and $C_6H_{12}O_6M_2(OH)_6$ and have a flaky crystalline appearance known as a "scale" preparation.

The equations representing the formation of these mordants are as follows:

SUCRATES OR SACCHARATES.

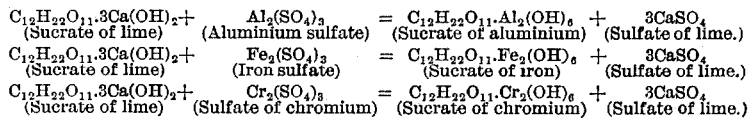

GLUCATES.

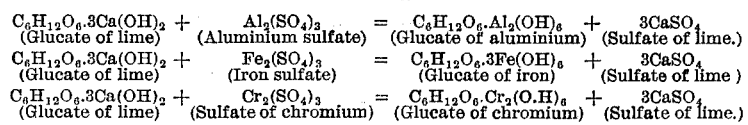

The formulæ of the resulting compounds are therefore—

| | Sucrates. | Glucates. |
|---|---|---|
| Aluminium | $C_{12}H_{22}O_{11}.Al_2(OH)_6$ | $C_6H_{12}O_6.Al_2(OH)_6$ |
| Iron | $C_{12}H_{22}O_{11}.Fe_2(OH)_6$ | $C_6H_{12}O_6.Fe_2(OH)_6$ |
| Chromium | $C_{12}H_{22}O_{11}.Cr_2(OH)_6$ | $C_6H_{12}O_6.Cr_2(OH)_6$ |

As mordants for the class of dyes to which they apply they are improvements on the existing compounds or salts of the same metals at present in use, first, in that they are capable of depositing the metallic base on the fiber or textile in such a form as to be more adaptable to the formation of color lakes with the coloring matter which form lakes therewith, (as an example, an alumina mordant as described made basic and mixed with an equal quantity of acetate of alumina containing some sulfate of alumina will produce an equal depth of color with from twenty-five per centum to thirty-three per centum less alizarine than would be required to produce an equal depth of color were an ordinary acetate or sulfo-acetate employed as a mordant;) second, in being more free from objectionable impurities such as the empyreumatic or tarry matters contained in the ordinary pyrolignites or acetates of the metals referred to and which are the mordants mostly used, there being no tarry or empyreumatic matters in the substances from which the sucrates or saccharates are formed, and are obtained at less cost than the acetates, sulfo-acetates or other compound consisting of an organic acid with a metallic base and other mordants which they are destined to replace. These sucrates not being acid mordants and being capable of being decomposed by steam can in use be mixed with oleine, alizarine or soluble oil without decomposing the oil principle and so the coloring matters may be added to such a mixture and together printed on the fabric and decomposed and fixed by steaming by the ordinary steaming process known to calico printers as "extract work or style" thus obviating the necessity of preparing the fabric in the oleine, &c., previously to printing the mixture of mordant and color. Further in consequence of these metallic sucrate or saccharate mordants not being acid the doctors, engraved rollers and other metal parts of the printing machines which come in contact with the mordants will not suffer or be affected thereby; and when mixed with the acid mordants the acidity of the latter is reduced in proportion to the amount of the sucrate used.

What I claim as my invention, and desire to protect by Letters Patent, is—

1. A new or improved mordant for use in the dyeing and printing of textile fabrics consisting of a solution of a salt of aluminium having a flaky crystalline appearance derived from sugar hydrated lime and a sulfate of alumina the sugar and the metal being combined in almost equal molecular proportions and having the formula $C_{12}H_{22}O_{11}Al_2(OH)_6$.

2. The process of preparing a metallic sucrate (of the metals aluminium, iron or chromium) which consists in adding to a solution of sucrate of an alkaline earth metal a sulfate of the metal which is required as the base of the mordant thereby precipitating a sulfate of the alkaline earth metal and then separating the solution of the metallic sucrate substantially as described.

3. The process of preparing a mordant for use in the dyeing and printing of textiles and fibers which consists in treating a sugar with fresh hydrate of lime of creamy consistency to form a sucrate of lime treating a metallic sulfate of the iron group with the compound so formed the reaction forming a sucrate of the metal and precipitating sulfate of lime and finally separating the solution of the sucrates from the precipitated sulfate substantially as described.

In testimony whereof I have signed my name to this specification in the presence of two subscribing witnesses.

R. H. PICKLES.

Witnesses:
J. OWDEN O'BRIEN,
CHAS. OVENDALE.